No. 732,581. PATENTED JUNE 30, 1903.
T. J. McGRATH.
INDICATOR.
APPLICATION FILED SEPT. 27, 1902.
NO MODEL.
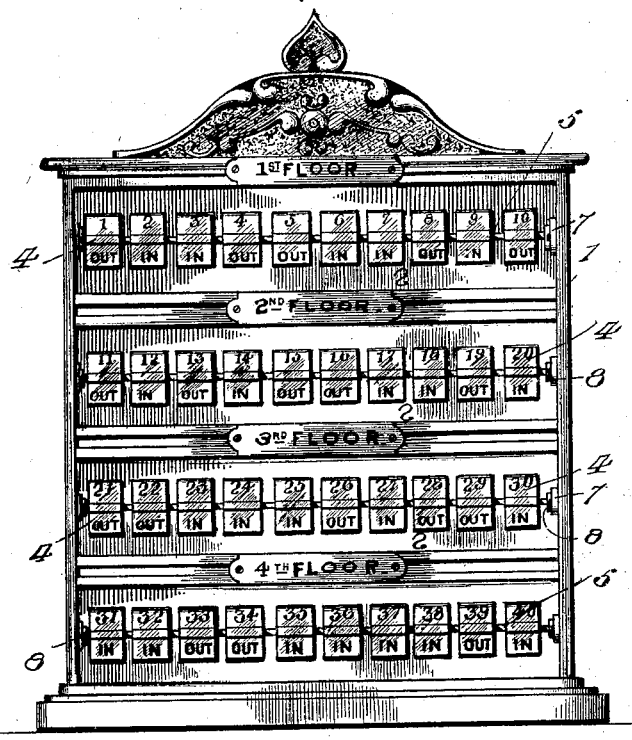
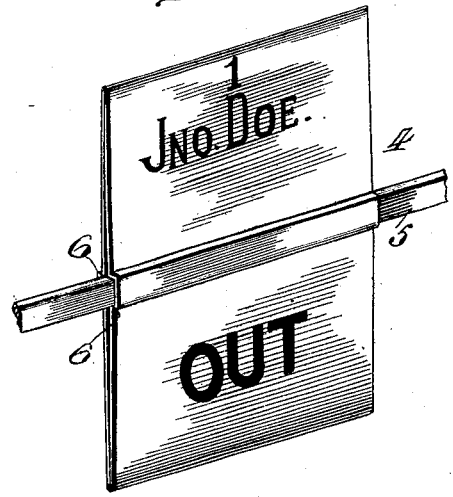
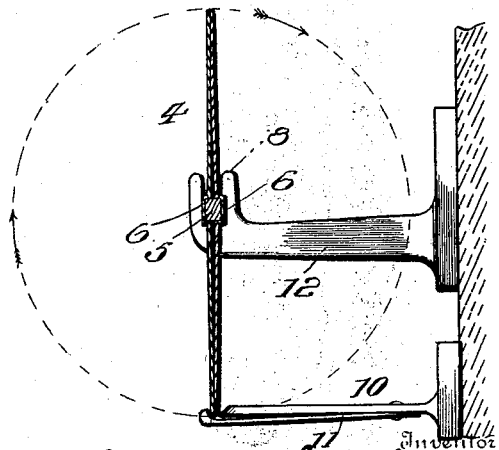
Witnesses
Inventor
Thos. J. McGrath,
By Thos. E. Robertson,
Attorney No. 732,581. Patented June 30, 1903.

UNITED STATES PATENT OFFICE.

THOMAS JORDAN McGRATH, OF PORTLAND, OREGON, ASSIGNOR OF ONE-HALF TO JOHN ELMQUIST, OF PORTLAND, OREGON.

INDICATOR.

SPECIFICATION forming part of Letters Patent No. 732,581, dated June 30, 1903.

Application filed September 27, 1902. Serial No. 125,117. (No model.)

*To all whom it may concern:*

Be it known that I, THOMAS JORDAN MC-GRATH, a citizen of the United States of America, and a resident of Portland, in the county of Multnomah, State of Oregon, have invented certain new and useful Improvements in Indicators, of which the following is a specification.

This invention relates to that class of indicators for offices, hotels, and similar places which are designed to indicate whether or not the occupant of any room in the building is in; and my invention consists in its preferable form of a cabinet having a row of indicators for each floor in the building, each row having an indicator for each office on the floor it represents. The indicators are substantially flat and are rotatably supported, so that when the occupant of any room leaves the building he may indicate that he is out by turning one side of the indicator to view and when he enters the building he turns the other side of the indicator to indicate that he is in, the indicators having his name and the words "In" and "Out" on opposite sides thereof.

In the accompanying drawings, which form a part of this application, Figure 1 is an elevation of a cabinet having four rows of indicators thereon arranged for a four-story building. Fig. 2 is an elevation of one of the supports with only one indicator supported thereon. Fig. 3 is a vertical central section taken through one of the indicators and its support, this last figure also showing an additional means of holding the indicators in position.

Referring now to the details of the drawings by numerals, 1 indicates a cabinet divided to indicate or represent four floors of a building, the rows being labeled "1st floor," "2d floor," &c., as shown at 2 in Fig. 1. Each of these rows has a series of indicators 4, supported in the cabinet by means of rods 5, each rod passing through all the indicators on its respective row. Each of the indicators 4 preferably consists of two plates, each having a rectangular groove 6 formed near its center, and the plates have their ends soldered together, so that the grooves coincide and form a passage through which passes the rod 5. The plates are soldered at their ends only, so that their centers may spring apart to permit the indicators to be turned on the rod when sufficient force is applied to the indicator to overcome the springiness of the plates. Each of the rods 5 is flattened, as shown in the drawings, to correspond with the shape of the grooves in the indicators, so that the indicators may be held in their proper positions on the rods. Each of the indicators is marked with the word "In" on one side and with the word "Out" on the other, each indicator also having marked thereon on each of its sides the number of the room it represents and the name of the occupant of that room.

Rods 5, which have been mentioned as supporting the indicators, may be secured in the cabinet in any desired manner; but I prefer that shown in the drawings, which consists of a plate 7, arranged to be screwed to the side of the cabinet and having a boss 8, in which is formed a socket to receive the rod 5, the socket being of corresponding shape to the rods, so as to prevent the latter from rotating therein. The plates and sockets may be the same on each end, or one end may be formed with a hooked plate 12 to permit of the ready attachment of the rod to allow the slides to be changed, if necessary. If desired, the plates may be held at the bottom, as shown in Fig. 3, by means of a plate 10 and spring-finger 11, which coact with the edges of the indicators to hold them in position.

It will be unnecessary to give any description of the operation of my invention except to state that the indicators are so supported on their rods that they may be held in any desired position, and therefore whenever the occupant of any room enters or departs from the building he merely moves the indicator to cause it to rotate so as to display the word "In" or the word "Out," whichever is correct.

I am of course aware that indicators for similar purposes are old, and I therefore do not claim such broadly.

What I claim as new is—

1. In an indicator, a cabinet or board containing a row of indicators for each floor of the building, each row having a suitably-supported rod, and each rod having a number of indicators arranged to rotate thereon, each indicator extending on each side of its rod, and the rod and indicators coacting to hold or lock the indicators in the desired position, substantially as described.

2. In a device of the character described, a suitably-supported rod, an indicator extending on both sides of said rod and rotatably held thereon, said indicator and rod being correspondingly formed to normally hold the indicator in the desired position, and yet permitting movement of the indicator on the rod when force is exerted, substantially as described.

3. In a device of the character described, a suitably-supported rod, an indicator rotatably held thereon, said indicator having a recess therein and said recess and the rod being correspondingly formed to normally hold the indicator in position, and yet permitting movement of the indicator on the rod when force is exerted, substantially as described.

4. In a device of the character described, a suitably-supported rod of rectangular form, and an indicator rotatably held on said rod and having a rectangular opening therein, through which the rod passes, the said indicator arranged to yield as it turns on said rectangular rod, substantially as described.

5. In a device of the character described, a suitably-supported rod, and an indicator rotatably held thereon, said indicator comprising two plates held together at their ends and having a recess through which said rod passes, said plates arranged to spread in order that they may turn on the rod, substantially as described.

6. In a device of the character described, a suitably-supported rod, and an indicator rotatably held thereon, said indicator comprising two plates secured together and having a recess left between them, said recess and the rod being correspondingly formed to prevent the indicator from easily turning on its rod, substantially as described.

7. In a device of the character described, a suitably-supported rod, an indicator rotatably held thereon, said indicator comprising two plates secured together and having a recess left between them, said recess and the rod being correspondingly formed to prevent the indicator from easily turning on its rod, and a spring-finger coacting with the plates to assist in preventing them from turning, substantially as described.

Signed by me at Portland, Oregon, this 30th day of August, 1902.

THOMAS JORDAN McGRATH.

Witnesses:
  A. CASWELL,
  C. O'BRIEN.